(12) United States Patent
Campbell et al.

(10) Patent No.: US 10,021,372 B2
(45) Date of Patent: Jul. 10, 2018

(54) SYSTEMS AND METHODS FOR IMPROVED DEPTH SENSING

(71) Applicant: QUALCOMM Incorporated, San Diego, CA (US)

(72) Inventors: Shandon Campbell, San Diego, CA (US); Stephen Michael Verrall, Carlsbad, CA (US); Kalin Mitkov Atanassov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/268,330

(22) Filed: Sep. 16, 2016

(65) Prior Publication Data

US 2018/0084240 A1    Mar. 22, 2018

(51) Int. Cl.
| | |
|---|---|
| *H04N 13/00* | (2018.01) |
| *H04N 5/235* | (2006.01) |
| *H04N 5/238* | (2006.01) |
| *G06T 7/00* | (2017.01) |
| *H04N 13/02* | (2006.01) |

(52) U.S. Cl.
CPC ....... *H04N 13/0253* (2013.01); *G06T 7/0002* (2013.01); *H04N 5/238* (2013.01); *H04N 5/2351* (2013.01); *H04N 5/2353* (2013.01); *H04N 13/0022* (2013.01); *G06T 2207/10028* (2013.01); *H04N 2013/0081* (2013.01)

(58) Field of Classification Search
CPC ........ G06T 2207/10028; G06T 7/0002; H04N 13/0022; H04N 13/0253; H04N 2013/0081; H04N 5/2351; H04N 5/2353; H04N 5/238
See application file for complete search history.

(56) References Cited

U.S. PATENT DOCUMENTS

| | | | |
|---|---|---|---|
| 4,998,823 | A | 3/1991 | Kitajima |
| 5,760,885 | A | 6/1998 | Yokoyama et al. |
| 6,490,028 | B1 | 12/2002 | Ditto et al. |
| 8,558,873 | B2 | 10/2013 | McEldowney |
| 2015/0177625 | A1 | 6/2015 | De Boer et al. |

(Continued)

FOREIGN PATENT DOCUMENTS

| | | |
|---|---|---|
| EP | 2779092 A1 | 9/2014 |
| EP | 3007096 A1 | 4/2016 |

OTHER PUBLICATIONS

International Search Report and Written Opinion—PCT/US2017/043735, International Search Authority—European Patent Office, dated Oct. 4, 2017.

*Primary Examiner* — Anner N Holder
(74) *Attorney, Agent, or Firm* — Paradice and Li LLP (57) ABSTRACT

Methods and apparatus for active depth sensing are disclosed. In some aspects, an imaging device may generate first depth information based on an active sensing technology, such as structured light. In some aspects, at least some of the first depth information may be missing or inaccurate, perhaps due to an extended range between the imaging device and a subject of the image. Additional range information may then be generated based on a zero order component of the structured light. The additional range information may then be used alone or combined with the first depth information and used to control one or more parameters of an imaging device, such as an exposure time and/or aperture.

20 Claims, 8 Drawing Sheets

(56) References Cited

U.S. PATENT DOCUMENTS

2016/0127714 A1\* 5/2016 Hazeghi ............. G02B 27/0075
  348/46
2017/0064288 A1\* 3/2017 Wang ................. H04N 13/0246
2018/0033146 A1\* 2/2018 Bleyer ................. G06T 7/0057

\* cited by examiner

SYSTEMS AND METHODS FOR IMPROVED DEPTH SENSING

BACKGROUND

Field

This technology relates to active depth sensing, and more specifically, to generating a depth map of a scene to facilitate refinement of image capture parameters and post capture image processing.

Description of the Related Art

Imaging devices that are structured light active sensing systems include a transmitter and a receiver configured to transmit and receive patterns corresponding to spatial codes (or "codewords") to generate a depth map that indicates the distance of one or more objects in a scene from the imaging device. The farther away an object in a scene is from the transmitter and the receiver, the closer a received codeword reflected from the object is from its original position (compared to the transmitted codeword) because a propagation path of the outgoing codeword and the reflected incoming codeword are more parallel. Conversely, the closer the object is to the transmitter and receiver, the farther the received codeword is from its original position in the transmitted codeword. Accordingly, the difference between the position of a received codeword and the corresponding transmitted codeword may be used to determine the depth of an object in a scene. Structured light active sensing systems may use these determined depths to generate a depth map of a scene, which may be a three dimensional representation of the scene. Many applications may benefit from determining a depth map of a scene, including image quality enhancement and computer vision techniques.

In some aspects, generating a depth map may include detecting codewords. In some aspects, the codewords may include an array of symbols. Decoding filters may identify spatial boundaries for codewords and symbols, and classify symbols as, for example, "0" or "1" based on their intensity values. Decoding filters may use matched filters, corresponding to the set of harmonic basis functions used to define the set of possible codewords, to classify incoming basis functions. Therefore, depth map accuracy depends on accurately receiving symbols, codewords, and/or basis functions.

If the light source used to project a pattern (for example, a laser) is too low, then spots corresponding to brighter symbols may be too dark to be differentiated from darker symbols. Accordingly, there is a need for methods and systems to improve depth map generation for digital imaging applications.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include reduced power consumption in an imaging pipeline.

Depth sensing for image capture may utilize passive and/or active sensing approaches. Passive sensing depth solutions may perform keypoint detection within a first digital image captured from a scene. However, the effectiveness of these methods may be limited in imaging environments with relatively few features, for example, when a scene includes one or more relatively flat surfaces.

Active sensing solutions rely on a powered signal. However, the power used to create the signal may be dispensed and spread through a diffractive optical element, preventing depth detection at relatively larger distances. In particular diffractive optical elements (DOE) structure light from a laser to facilitate disparity tracking of a pattern embedded in the DOE. The disparity in the pattern when reflected back from images in a scene corresponds to the depth of the scene at the various positions within the DOE. To facilitate the highly diffractive pattern, the diffractive optical elements may cause substantial amounts of energy dissipation at any singular point within the scene being analyzed. As a distance from the light source to objects in the scene increases, the amount of light energy reaching the objects in the scene fades.

The diffraction of the light source essentially limits the effective range with which effective range determinations can be made when using a DOE. However, the zero-order, non-diffracted DC component or zero frequency component of a Gaussian beam light source, is less detracted by the DOE than other components of the beam. Therefore, a distance at which effective depth detection may be performed is considerably larger for the zero order components of the light beam than for the components effectively diffracted by the DOE. However, the zero order portion of the DC component does not provide effective depth detection for a large portion of the scene, but instead for a relatively smaller portion of the scene positioned in front of the light source itself.

To detect a depth using the zero order component, a location of the zero-order component may be determined at a variety of known distances. This information may be stored in a calibration table of an image device in some aspects. When a digital image of a scene is captured, an initial depth map may be generated based on a structured light method. If the depth map resulting from the structured light method does not meet one or more quality criteria, further depth information may be obtained based on a position of the zero order component in the digital image. One or more camera settings may then be based on the obtained depth information.

One aspect disclosed is a method of depth sensing. The method includes illuminating a scene, the illumination including a structured light pattern component, and a zero order component, capturing an image of the illuminated scene, generating a depth map for the scene based on the structure light pattern in the image, determining a quality level of the depth map, in response to the quality level of the depth map meeting a first criteria determining depth information based on a position of the zero order component in the image, and generating a second image based on the depth information.

In some aspects, the method also includes generating a second image based on the depth map in response to the quality level of the depth map meeting a second criteria and/or writing the second image to an output device. In some aspects, determining depth information based on the zero order component position comprises comparing the determined zero order position to predetermined positions corresponding to predetermined depths; and determining the depth information based on the comparison.

In some aspects, the method also includes interpolating between two predetermined positions based on the position of the zero order component in the image; and determining the depth information based on the interpolation. In some aspects, determining the quality of the depth map comprises determining a percentage of invalid depth values in the depth map, wherein the quality of the depth map is based, at least in part, on the percentage of invalid depth values.

In some aspects, determining the quality of the depth map comprises determining a size of a region of invalid depth values in the depth map, wherein the quality of the depth map is based, at least in part, on the size.

Another aspect disclosed is an apparatus for depth sensing. The apparatus includes an image sensor, a light emitter, and an electronic hardware processor, configured to: illuminate a scene using the light emitter, the illumination including a structured light pattern component, and a zero order component, capture an image of the illuminated scene with the image sensor, generate a depth map for the scene based on the structure light pattern in the image, determine a quality level of the depth map, and in response to the quality level of the depth map meeting a first criteria: determine depth information based on a position of the zero order component in the image, and generate a second image based on the depth information.

In some aspects, the electronic hardware processor is further configured to generate a second image based on the depth map in response to the quality level of the depth map meeting a second criteria. In some aspects, the electronic hardware processor is further configured to write the second image to an output device. In some aspects, determining depth information based on the zero order component position comprises comparing the determined zero order position to predetermined positions corresponding to predetermined depths, and determining the depth information based on the comparison. In some aspects, the electronic hardware processor is further configured to interpolate between two predetermined positions based on the position of the zero order component in the image; and determine the depth information based on the interpolation.

In some aspects, the electronic hardware processor is further configured to determine the quality of the depth map by determining a percentage of invalid depth values in the depth map, wherein the quality of the depth map is based, at least in part, on the percentage of invalid depth values. In some aspects, the electronic hardware processor is further configured to determine the quality of the depth map by determining a size of a region of invalid depth values in the depth map, wherein the quality of the depth map is based, at least in part, on the size.

Another aspect disclosed is a computer readable storage medium comprising instructions that when executed cause an electronic hardware processor to perform a method of depth sensing. The method includes illuminating a scene, the illumination including a structured light pattern component, and a zero order component, capturing an image of the illuminated scene, generating a depth map for the scene based on the structure light pattern in the image, determining a quality level of the depth map, in response to the quality level of the depth map meeting a first criteria: determining depth information based on a position of the zero order component in the image, and generating a second image based on the depth information.

In some aspects, the method of the computer readable storage medium also includes generating a second image based on the depth map in response to the quality level of the depth map meeting a second criteria. In some aspects, the method of the computer readable storage medium also includes writing the second image to an output device. In some aspects of the computer readable storage medium, determining depth information based on the zero order component position comprises comparing the determined zero order position to predetermined positions corresponding to predetermined depths; and determining the depth information based on the comparison.

In some aspects, the method of the computer readable storage medium also includes interpolating between two predetermined positions based on the position of the zero order component in the image; and determining the depth information based on the interpolation. In some aspects of the computer readable storage medium, determining the quality of the depth map comprises determining a percentage of invalid depth values in the depth map, wherein the quality of the depth map is based, at least in part, on the percentage of invalid depth values.

BRIEF DESCRIPTION OF THE DRAWINGS

The various features illustrated in the drawings may not be drawn to scale. Accordingly, the dimensions of the various features may be arbitrarily expanded or reduced for clarity. Furthermore, dotted or dashed lines and objects may indicate optional features or be used to show organization of components. In addition, some of the drawings may not depict all of the components of a given system, method, or device. Finally, like reference numerals may be used to denote like features throughout the specification and figures.

DETAILED DESCRIPTION

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Figure 1:
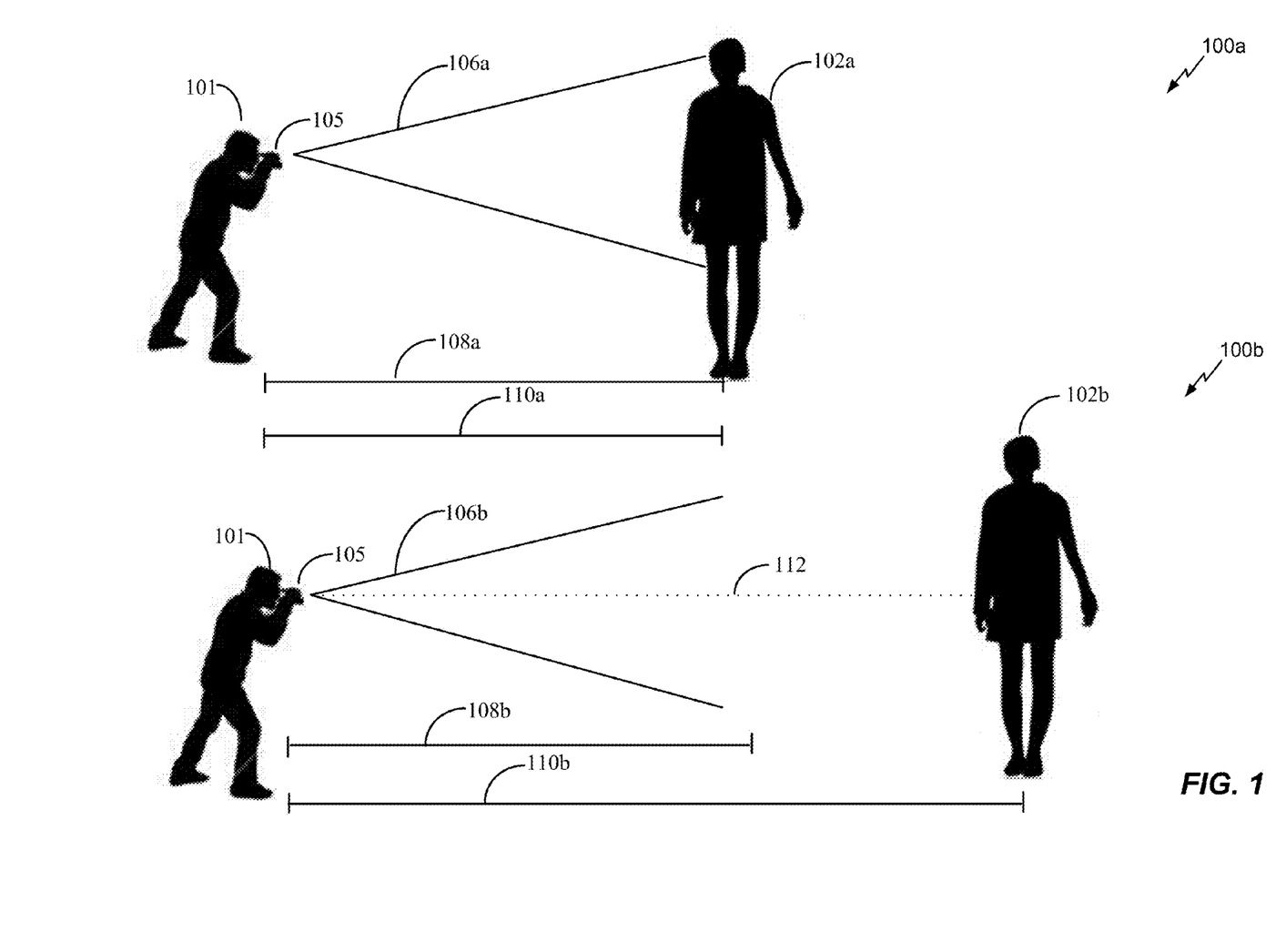
FIG. 1 is an overview diagram showing two image capture scenarios 100a-b showing a photographer 101 capturing images of two scenes at two different distances.

Furthermore, although particular aspects are described herein, many variations and permutations of these aspects fall within the scope of the disclosure. In addition, the scope of the disclosure is not intended to be limited to particular the benefits, uses, or objectives disclosed herein. Rather, aspects of the disclosure are intended to be broadly applicable to different wired and wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof FIG. 1 is an overview diagram showing two image capture scenarios 100a-b showing a photographer 101 capturing images of two scenes at two different distances. In both scenarios 100a-b, the photographer is holding an image device 105. The imaging device 105 may generate light 106a-b organized into one or more patterns (e.g. utilize a structured light method for example) to obtain depth information for a scene including subjects 102a-b respectively. In some aspects, the imaging device 105 may include a light source, with light generated by the light source passed through a diffraction grating to produce the generated light 106a-b as one or more patterns.

In the first imaging scenario 100a, the photographer 101 is standing at a distance 110a from the subject 102a. The structured light method used by the imaging device 105 may have an effective range, shown as 108a. Because the subject 102a is within the effective range 108a in image capture scenario 100a, the structured light method used by the imaging device 105 may generate a depth map that may then be used to capture a second image of the subject 102a. For example, the depth map may be used to set one or more of an exposure time, aperture, or flash intensity when capturing the second image. Use of the depth map when controlling image capture settings of the camera 105 for the second image may provide for improved image quality over images captured without the use of a depth map.

Image capture scenario 100b in FIG. 1 shows the photographer 101 capturing another image of a subject 102b using the imaging device 105. As was the case in scenario 100a, the imaging device 105 generates light, organized as a structured light pattern, to facilitate obtaining depth information for a scene being imaged in imaging scenario 100b. In contrast to image capture scenario 100a, the subject 102b is at a different and longer distance 110b than the distance 110a used to capture the first image of subject 102a in scenario 100a discussed above. An effective range of the structured light method employed by the imaging device 105 in image capture scenario 100b is shown as distance 108b. Because the distance 110b from the imaging device 105 to the subject 102b is larger in scenario 100b, the subject 102 is shown outside the effective range 108b of the structured light method utilized by the imaging device 105. Therefore, an image of the subject 102 captured at the distance 110b may be of a lower quality than if the subject 102b had been within the effective range 108b of the structured light method, as shown in the image capture scenario 100a discussed above.

Also shown in image capture scenario 100b is a zero order component 112 of light generated by the imaging device 105. The zero order component may also be present in the light generated in image capture scenario 100a, but is not shown for figure clarity. The zero order component 112 may be described as a DC component of a light which passes generally through a diffraction grating of the camera 105 without being diffracted. The zero order portion 112 of the light passes through the diffraction grating similar to how light might otherwise pass through a lens. In some aspects, the zero order component 112 of the light will be generated at an angle equal and opposite to an angle incident to how light from a light source hits the grating.

The zero order component may also be expressed via the grating equation when m=0, shown below in equation 1:

$$m\lambda = d(\sin \alpha + \sin \beta) \qquad (1)$$

where:
  $\lambda$ is the wavelength diffracted from a grating of groove spacing d.
  m is the diffraction order (or spectral order)
  $\alpha$ is an angle of incidence of light diffracted by the grating along a set of angles $\beta$ The zero order component 112 may be utilized in some aspects of the disclosed systems and methods to provide depth information for a scene being imaged in imaging scenario 100b. In some aspects, the zero order component 112 is utilized where the subject 102 is outside the effective range 108b of the structured light active dense sensing employed by the imaging device 105. An effective range of the zero order component 112 may be longer than the effective range 108a-b of the structured light method used by the imaging device 105. For example, in some aspects, the effective range of the zero order component 112 for obtaining depth information may exceed the distance 110b between the photographer 101 and the subject 102 in imaging scenario 100b.

Figure 2:
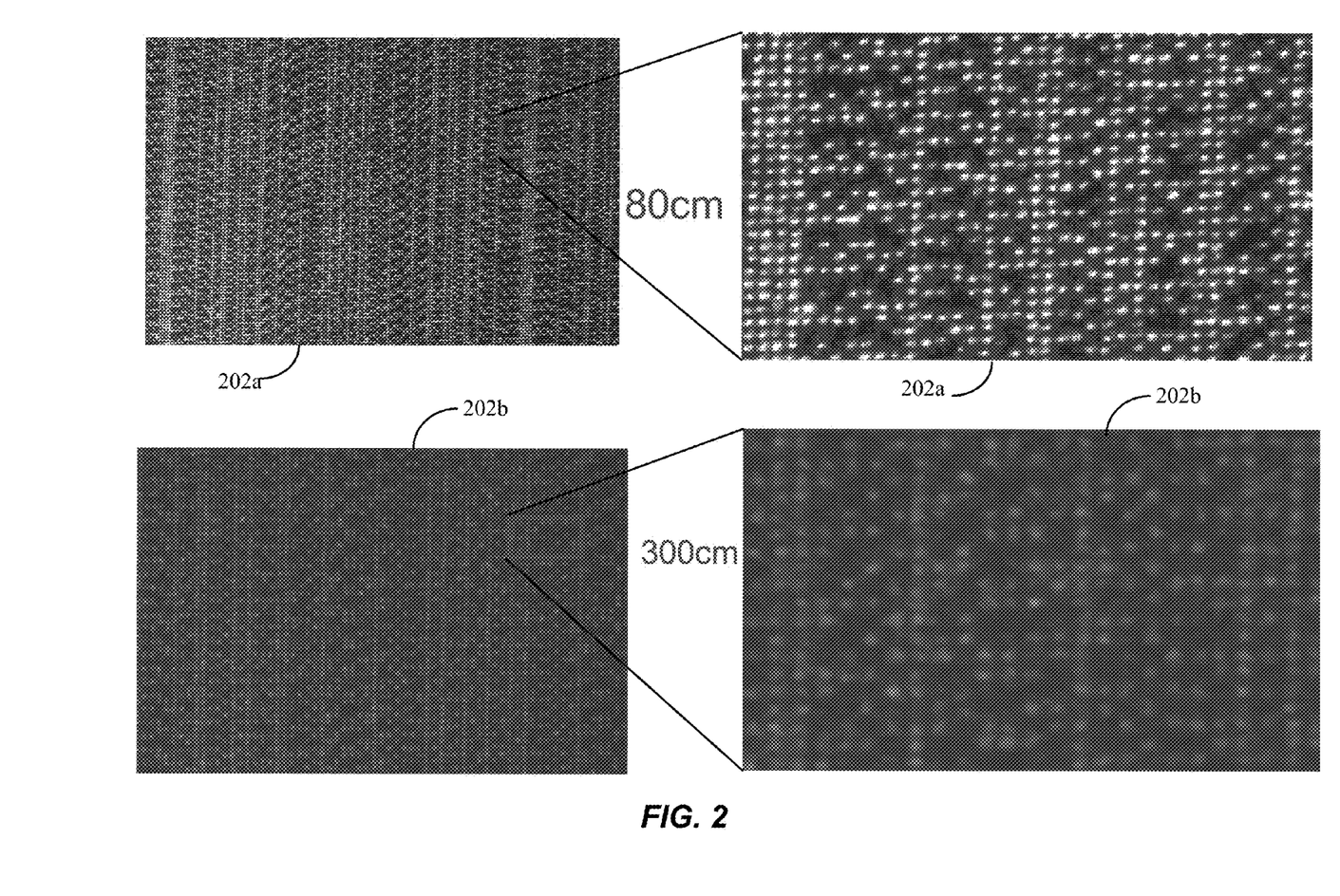
FIG. 2 shows two an equivalent structured light pattern captured in two different images 202a-b when illuminating a scene at two different respective ranges.

FIG. 2 shows two an equivalent structured light pattern captured in two different images 202a-b when illuminating a scene at two different respective ranges. The image 202a is captured when primary objects of the scene are 80 centimeters (cm) from the imaging device. As can be seen in the expanded view 204a of a portion of the image 202a, the structured light pattern is relatively clear at this range. In contrast, image 202b shows that at a range of 300 cm, the structured light pattern shown in the expanded view 204b has lost a substantial portion of its intensity relative to the expanded view 204a, which was captured from a scene within shorter ranges. The reduced intensity of the structured light pattern received in the image 202b may reduce an accuracy and/or reliability of a depth map generated from the image 202b when capturing scenes from relatively longer ranges.

Figure 3:
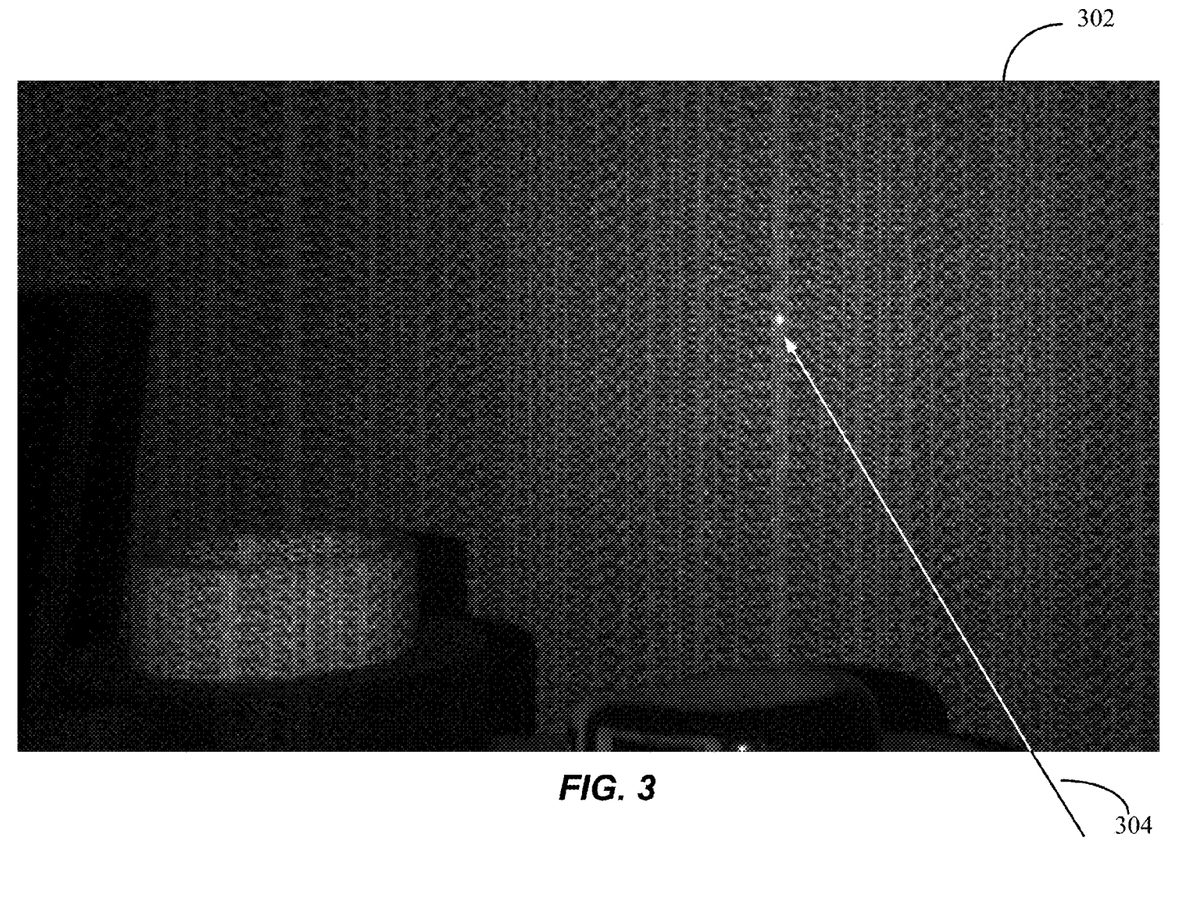
FIG. 3 shows a structured light pattern that may be generated by a Gaussian beam light source through a diffractive optical element (DOE).

FIG. 3 shows a structured light pattern that may be generated by a Gaussian beam light source through a diffractive optical element (DOE). Also shown in the structured light pattern 302 is a zero order component, identified via the arrow 304. The zero order component is a portion of the Gaussian beam light source that was directly transmitted to the scene from the source, and was not generally diffracted by the DOE.

Figure 4:
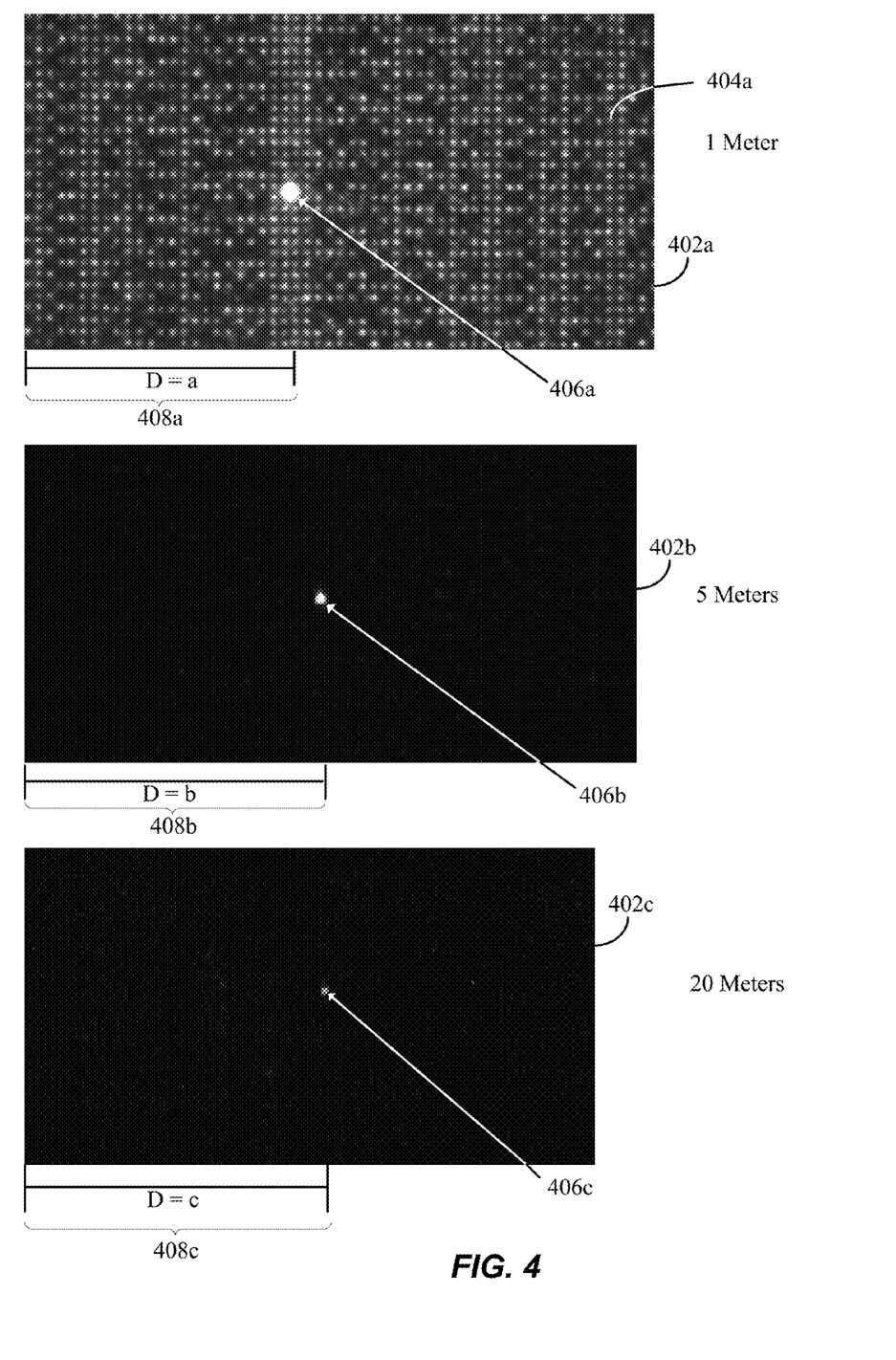
FIG. 4 shows three images of a structured pattern captured via an imaging device from scenes including objects having three different ranges respectively.

FIG. 4 shows three images of a structured pattern captured via an imaging device from scenes including objects having three different ranges respectively. The first image 402a shows both the structured light pattern 404a and the zero order component 406a. The structured light pattern 404a may be present in the first image 402a because a scene in the image 402a includes objects within a range of the structured light pattern, for example, as shown in image 202a of FIG. 2. Given the range of objects present in the scene imaged by image 402a, the zero order component 406a is at a first position in the image, shown as a first distance 408a from the left hand border of the image 408a.

Image 402b is of a scene with objects at a range of five (5) meters from the imaging device. In contrast to the image 402a, no structured light pattern is discernable in the image 402a. This may result from the increased range of objects in the scene of image 402b as compared to the range of objects in the scene of image 402a. Because the objects of image 402b are at a greater distance from the imaging device that the objects of image 402a, any reflections of the structured light pattern from the objects of the image 402b are too attenuated when reaching the imaging device, that they are not discernable in the image 402b. Thus, a depth map generated from structured light present in the image 402b may be incomplete or unreliable. In some aspects, no depth information may be derivable from a structured light pattern of image 402b. Image 402b also shows a zero order component 406b. Because the range to the objects of the scene of image 402b are at a distance of 5 meters, as opposed to the distance of 1 meter with image 402a, the position of the zero order component 406b is shifted (to the right) relative to the position of the zero order component 406a of image 402a. As shown, the zero order component 406b is at a distance 408b from the left edge of the image 402b, which is greater than the distance 408a of the zero order component 406a in image 402a from the left edge of the image 402a. This difference in distances 408a and 408b may be utilized to estimate a range to an object in the scenes of images 408a-b.

Image 402c is of a scene with objects at a range of twenty (20) meters from the imaging device. A zero order component 406c is at a distance 408c from a left edge of the image 402c, which is greater than the distances 402a-b. This difference in the distances 408a-c can be utilized to estimate a range to an object in the scene of image 402c.

The relationship between range to an object and displacement of a zero order component may be obtained based on the grating equation, one form of which is shown below:

$$\sin(r) + \sin(i) = n\frac{\lambda}{\rho} \quad (2)$$

where:
r is an angle at which diffraction images are reconstructed
i is an angle of incidence of a wave front
n is a diffraction order
λ is a wavelength of incident energy
ρ is a pitch of the grating A measurement of the angle r at a receiver at a distance d from the grating will yield a range D of an object in a scene based on the relationship:

$$D = d\tan(r)\frac{\sqrt{1 - \left(n\frac{\lambda}{\rho} - \sin(r)\right)^2}}{n\frac{\lambda}{\rho} - \sin(r)} \quad (3)$$

Figure 5:
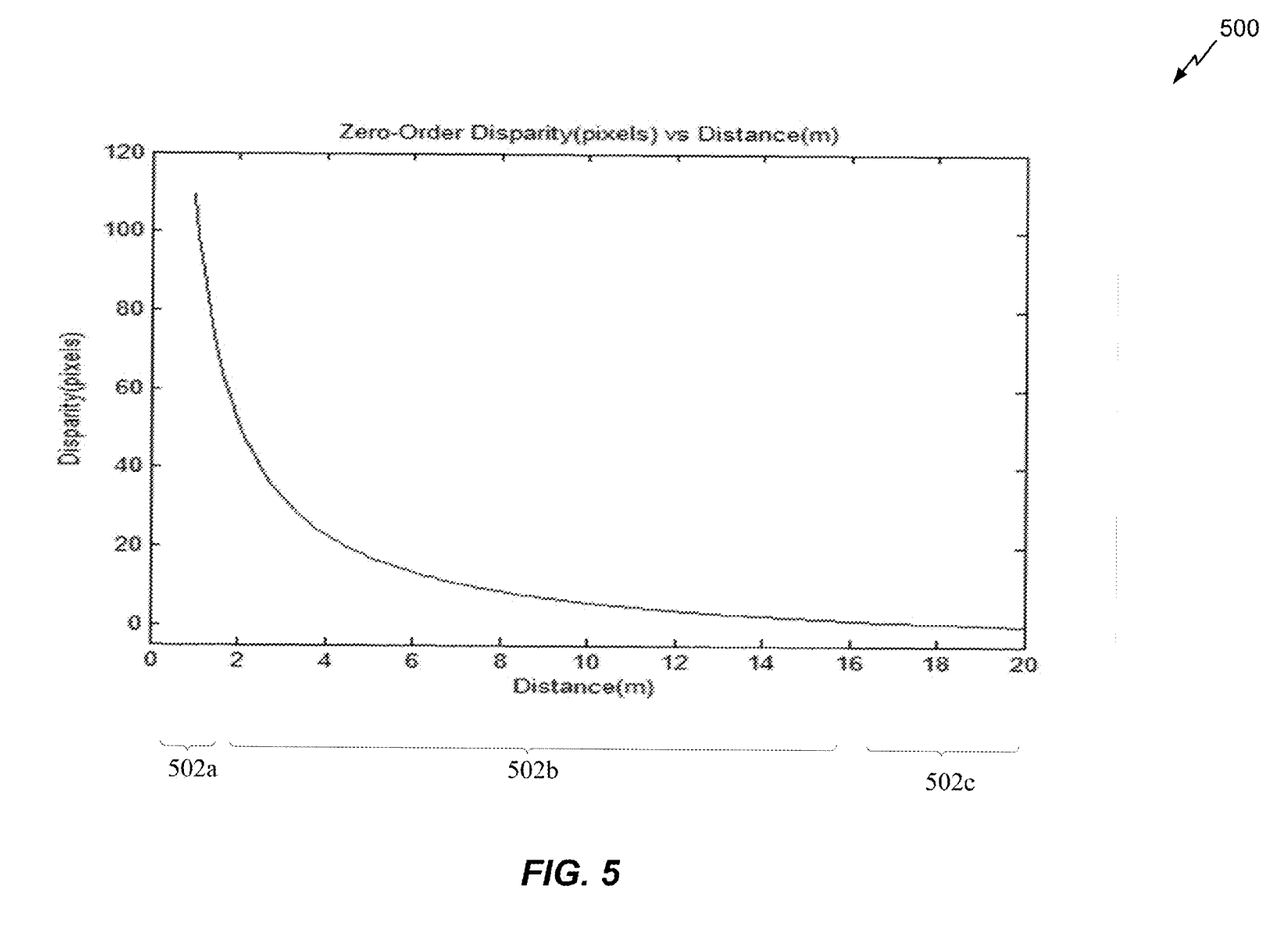
FIG. 5 is a graph of exemplary zero order displacements relative to a distance to an object of a scene.

FIG. 5 is a graph of exemplary zero order displacements relative to a distance to an object of a scene. The graph includes at least three regions of distance, 502a-c. In the first region 502a, a relatively small change in the distance of objects in a scene may result in a relatively large displacement of the zero order component. Within the distance range 502a, depth sensing may also be effective, and may provide depth information over a larger field of view than the zero order component is capable of providing. A second region 502b may exceed the effective range of a structured light based range sensing method, but may provide a predictable relationship between distance of objects in a scene and displacement of the zero order component. Within the region 502b, depth sensing based on the zero order component may provide depth information unable with today's structured light based methods.

As the distance from the imaging sensor enters the 502c region, changing in displacement of the zero order component become increasingly smaller as the distance increases further. This region may represent the limit to zero order based depth sensing, at least in the illustrated embodiment's illumination power provided to the scene being imaged.

Information such as that displayed in graph 500 of FIG. 5 may be used to generate a calibration table mapping displacements or disparities of zero order light components in a captured image, such as those shown in the y axis of FIG. 5, to known distances, such as those shown in the x axis of FIG. 5.

Figure 6:
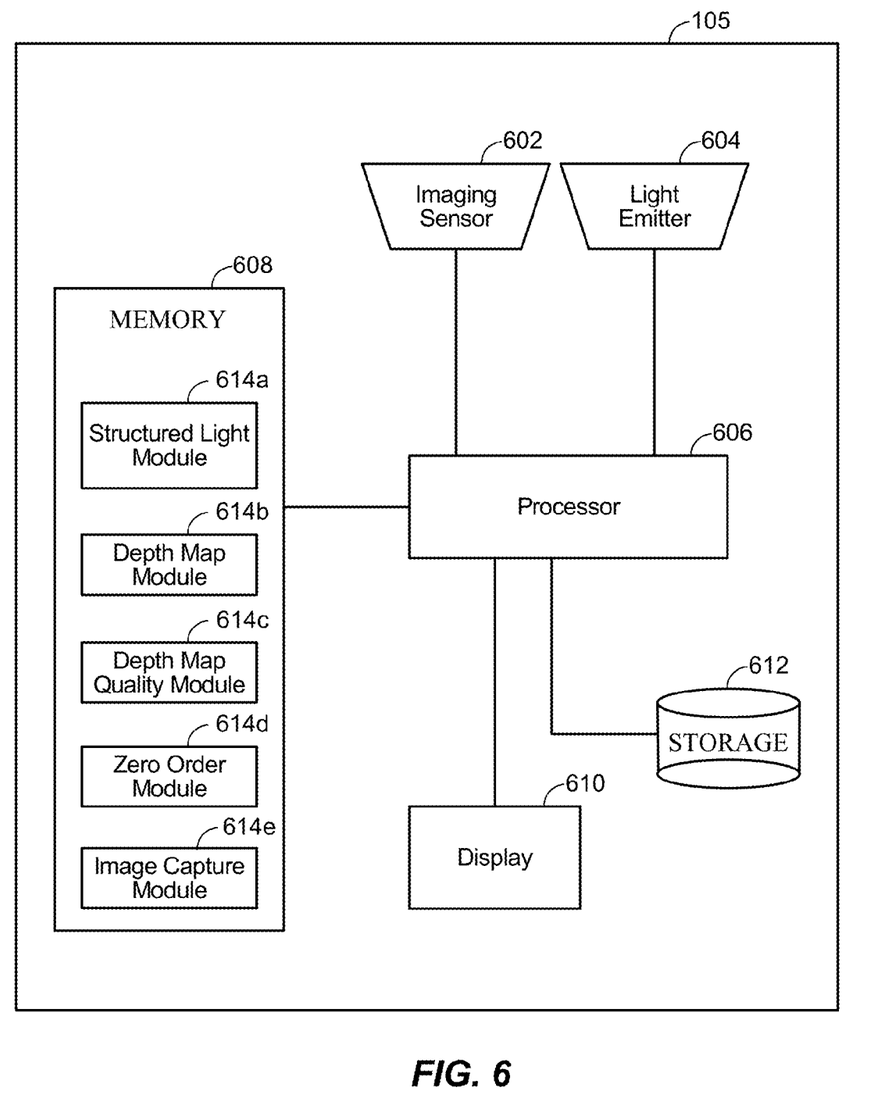
FIG. 6 is a structured block diagram of an exemplary device for performing the disclosed systems and methods.

FIG. 6 is a structured block diagram of an exemplary device for performing the disclosed systems and methods. The device 105 includes an imaging sensor 602, light emitter 604, electronic hardware processor 606, electronic memory 608, electronic display 610, and a storage 612.

The memory 608 stores multiple modules 614a-d, each module including instructions for the processor 606 that when executed, cause the processor 606 to perform one or more of the functions discussed herein. For example, structured light module 614a may configure the processor 606 to illuminate a scene with a structured light pattern via the light emitter 604, and then to capture an image of the illuminated scene via the imaging sensor 602.

The depth map module 614b may receive the image captured by the structured light module 614a and may generate a depth map based on the image.

The depth map quality module 614c may include instructions that configure the processor 606 to evaluate a quality of the depth map generated by the depth map module 614b.

The zero order module 614d may receive the image captured from the imaging sensor 602 from the structured light module and detect a position of a zero order component (of light emitted by the light emitter 604) in the image. The zero order module 614d may then compare the position of the zero order component in the image with calibration information. The calibration information may be stored in the storage 612 in some aspects. The calibration information may include calibration entries, each entry indicating a unique position of a zero order component and a corresponding distance to objects in a scene when that unique position occurred. For example, calibration information such as that shown in Table 1 below may be provided:

TABLE 1

| Zero Order Offset | Range |
| --- | --- |
| 60 pixels | 2 meters |
| 40 pixels | 3 meters |

TABLE 1-continued

| Zero Order Offset | Range |
|---|---|
| 20 pixels | 4 meters |
| 10 pixels | 8 meters |

The position of the zero order component in the image may then be correlated with the calibration information to determine depth information for the image. For example, the zero order module may identify at least two calibration entries with zero order positions closest to the observed zero order position in the image. The zero order module may then interpolate between the two distances in the two identified calibration entries, based on the at least two calibration zero order displacements and the observed displacement to arrive at distance information for the image.

The image capture module 614e may capture a second image based on one or more of the depth map generated by the depth map module 614b and depth information generated by the zero order module 614b. The capture of the second image may be based, at least in part, on a quality of the depth map as determined by the depth map quality module 614c. For example, if the depth map is of sufficiently high quality (above a threshold), the second image may be captured based on the depth map. However, if the quality of the depth map is below a threshold, the second image may be captured based on depth information provided by the zero order module 614d.

In some aspects, the storage 612 may store a calibration table, such as the exemplary calibration table shown in Table 1 above. The calibration table may store a plurality of zero order component displacements or disparities, and known distances associated with those disparities. For example, an exemplary calibration table may store information presented in the graph 500 of FIG. 5 in some aspects. As discussed above, the calibration table may be used by the disclosed systems and methods to determine depth information for a scene given a zero order component displacement observed from an image of the scene by interpolating data provided in the calibration table.

Figure 7:
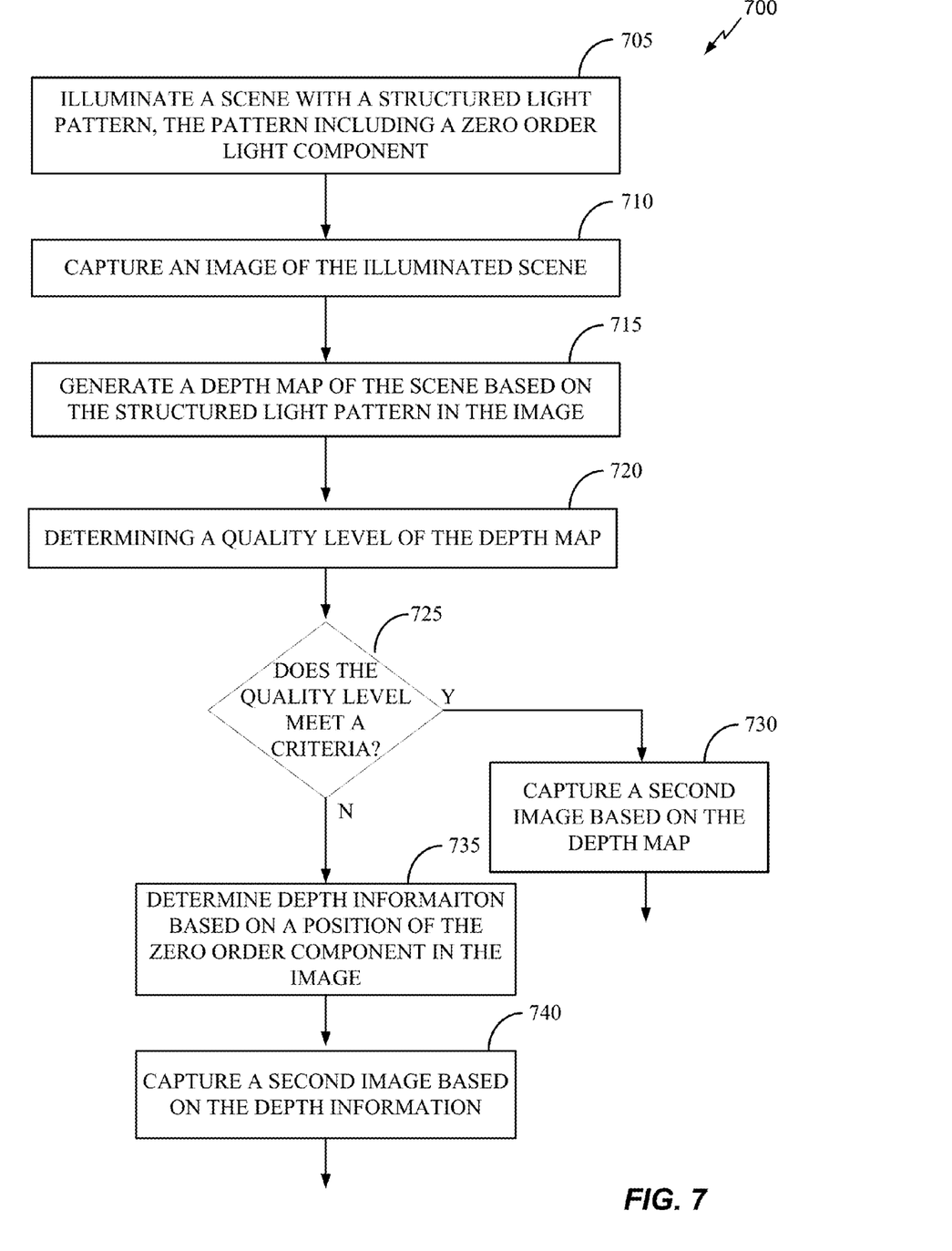
FIG. 7 is a flowchart of one method of capturing an image.

FIG. 7 is a flowchart of one method of capturing an image. In some aspects, one or more of the functions discussed below with respect to process 700 in FIG. 7 may be performed by an electronic hardware processor. For example, in some aspects, one or more of the functions discussed below may be performed by the electronic hardware processor 606, as configured by instructions in one or more of the structured light module 614a, depth map module 614b, depth map quality module 614c, zero order module 614d, and the image capture module 614e.

Process 700 provides for enhanced quality of images when capturing scenes that may be located at a distance that is beyond the range of traditional active sensing depth sensing technologies, such as structured light. The disclosed methods and systems combine at least two methods of active depth sensing, employing a structured light solution at shorter ranges, and a solution based on a zero order light beam at ranges beyond those of the structured light method. The range information may be used to set parameters of an imaging sensor when capturing an image of the scene. The range information may also be utilized in post-capture image processing functions, such as white balancing. As depth information may be provided over a greater range of scene distances than when a traditional active depth sensing solution is utilized, image quality may be enhanced.

In block 705, a scene is illuminated with a structured light pattern. An exemplary structured light pattern is shown in FIG. 2. In some aspects, block 705 may be performed by the electronic hardware processor 606. The electronic hardware processor 606 may be configured by instructions stored in the structured light module 614a to cause the light emitter 604 to illuminate the scene with a structured light pattern.

In block 710, an image is captured of the illuminated scene. For example, in some aspects, instructions in the structured light module 614a may configured the processor 606 to capture an image using the imaging sensor 602 while the scene is illuminated by the light emitter 604. In some aspects, instructions in the image capture module 614e may configure the processor 606 to perform one or more of the functions discussed above with respect to block 710.

In block 715, a depth map is generated based on the structured light pattern in the captured image of block 710. For example, in some aspects, the structured light pattern includes a series of stripes. Displacement of any single stripe can be converted into 3D coordinates of an object from which the stripe is reflected. In some aspects, alternating stripe patterns provide binary gray code sequences. The sequences identify each individual stripe reflecting from an object. For example, some aspects may trace or count strips across a captured image to identify each stripe. In some aspects, the width of a strip received by the imaging sensor relative to its width in a generated diffraction pattern may indicate a slope of a three dimensional object in the illuminated scene. Depth information may also be based on stripe frequency and/or phase. In some aspects, a depth map may be generated in block 715 according to any of the methods disclosed in S. Fanello, et. al of Microsoft Research, *Hyper-Depth: Leaning Depth from Structured Light Without Matching*, IEEE Conference on Computer Vision and Pattern Recognition (CVPR), pp. 5441-5450 (2016), or D. Scharstein et. al, *High-Accuracy Stereo Depth Maps Using Structured Light*, IEEE Computer Society Conference on Computer Vision and Pattern Recognition, volume 1, pp 195-202, Madison, Wis., June 2003, both of which are hereby incorporated by reference in their entirety.

In some aspects, block 715 may be performed by instructions in the depth map generation module 614b that configure the processor 606 to generate the depth map as described above.

In block 720, a quality level of the depth map is determined. In some aspects, the depth map may be analyzed to detect invalid, missing, or erroneous depth information. For example, if depth information for a pixel deviates from a characterization (such as an average or median value) of neighboring pixels (pixels within one, two, five, or ten pixels of the subject pixel for example) by more than a threshold, this depth information may be determined to be erroneous. Furthermore, in some aspects, the functions of block 715 may be unable to determine depth information for one or more pixels due to missing structured light information in the image captured in block 710.

In some aspects, the depth map quality module 614c may utilize the no-reference segmentation quality metric, described in S. Milani, et. al, *No-Reference Quality Metric for Depth Maps,* Dipartimento di Electtronica ed Informazione, Politecnico di Milano, Milano, Italy, which is hereby incorporated by reference. In some other aspects, the depth map quality module 614c may generate the metric disclosed in W. Jang, et. al, *FDQM: Fast Quality Metric for Depth Maps Without View Synthesis,* IEEE Transactions on Circuits and Systems for Video Technology, Vol. 25, No. 7, July 2015, which is hereby incorporated by reference. This metric may be used as a measure of depth map quality as discussed further below.

In some other aspects, the depth map quality module may determine a quality measurement of the depth map based on a percentage of the depth map that includes valid values. For example, in some aspects, if codes associated with particular positions in a structured light pattern generated by the structured light module 614a and the light emitter 604 are successfully received by the imaging sensor 602 and decoded by the processor 606, then the resulting corresponding values in the depth map may be valid. However, if the processor 606 is unable to decode structured light values at particular positions within a scene captured by the imaging sensor 602, then the depth map values at those positions may be considered invalid. In some aspects, the depth map quality module 614c may not only consider an overall percentage of invalid depth map values, but a maximum size of a contiguous set or region of invalid values. For example, if the depth map has a region or cluster of invalid values of a particular size, this condition may be considered by the quality measurement. In some aspects, a first depth map with a relatively high number of valid values may have a "low" quality depth map as compared to a second depth map having the same high number of valid values if the first depth map includes regions of invalid values larger than that of the second depth map (i.e. the invalid values in the second depth map are more dispersed).

In some aspects, the quality level of the depth map may be based on a subset of data in the captured image. For example, in some aspects, only information within a neighborhood of the zero order light component in the captured image may be utilized when determining the quality level. For example, in some aspects, only a portion of the image within 5, 10, 15, 20, 25, 30, 35, 40, 45, 50, 55, 60, 65, 70, 100, 125, 150, 200, 250 pixels of a center of the zero order component in the image may be utilized when determining the quality of the depth map.

In some aspects, a position of the zero order component in the image captured in block 710 may be utilized to determine a quality of the depth map. For example, if the position of the zero order component indicates that the scene is at a distance of the imaging device greater than a threshold (for example, infinity), then the quality of the depth may be set to a lower value than if the zero order component position indicates objects in the scene are at a closer distance. Similarly, in some aspects, a size of the zero order component in the first image of block 710 may be utilized to determine a quality of the depth map. For example, if the size of the zero order component is below a particular threshold, this may indicate that objects in the scene are at a distance greater than an effective range of the structured light pattern. Thus, this may result in the depth map being given a relatively lower quality score.

In some aspects, one or more of the functions discussed above with respect to block 720 may be performed by the instructions in the depth map quality module 614c that configure the processor 606 to perform the recited functions.

Decision block 725 determines whether the quality level of the depth map meets a first criterion. If the first criterion is met, this may indicate the quality level of the depth map is sufficient to adequately support subsequent image capture and or processing functions. For example, in some aspects, the criteria may be met when the quality level is above a particular predetermined threshold. If the first criterion is met, process 700 moves to block 730.

Block 730 captures a second image based on the depth map. For example, in some aspects, one or more of a sensor aperture, or exposure time, may be set based on the depth map. In some aspects, a focal distance of an imaging sensor such as imaging sensor 602 may be set based on the depth map. In some aspects, whether a flash is used when capturing the second image is also based on the depth map. For example, if the depth map indicates objects within the scene are within a particular distance range, the flash may be used. If objects in the scene are outside the particular distance range, the flash may not be used. In some aspects, a brightness or duration of the flash may also be based on the depth map.

Additionally, in some aspects, block 730 may include post image capture processing operations that are also based on the depth map. For example, one or more of depth of field adjustment, z-buffering or z-culling, shadow mapping, or subsurface scattering, or white balance may be performed based on the depth map. In some aspects, block 730 includes writing the second image to an output device. For example, the second image may be written to the storage 612 in some aspects. In some other aspects, the second image may be written to a network. In some aspects, one or more of the functions discussed above with respect to block 725 may be performed by instructions in the image capture module 614e that configure the processor 606 to perform the recited functions.

If the quality level does not meet the first criterion, process 700 moves from decision block 725 to block 735. In some aspects, not meeting the first criteria may be equivalent to meeting a second criteria. For example, if the first criteria indicate whether the quality level is above a threshold, the second criteria may indicate whether the quality level is equal to or below the threshold.

In block 735, depth information is determined based on a position of the zero order component in the image. As discussed above, in some aspects, block 735 may utilize calibration information providing a mapping of displacements of a zero order component within the first image of block 710 to distances of objects in the scene at that displacement, as shown for example, in FIG. 5. By interpolating the calibration information based on the observed zero order position in the first image of block 710, an estimated distance to objects in the scene (at least, in some aspects, those objects positioned to reflect the zero order component emitted by the light emitter 604 to the imaging sensor 602) may be determined. In some aspects, a size of the zero order component in the first image of block 710 may also be used to determine the depth information. For example, in some aspects, a second calibration table may be maintained that provided predetermined sizes of zero order components when objects in the scene are at predetermined ranges. Block 835 may determine a size of the zero order component in the first image of block 710 (for example, a number of pixels representing the zero order component) and interpolate between entries in the second calibration table to determine the range information.

In some aspects, one or more of the functions discussed above with respect to block 735 may be performed by instructions included in the zero order module 614d, which configure the processor 606 to perform one or more of the recited functions.

In block 740, a second image may be captured based on the depth information determined in block 735. For example, in some aspects, one or more of an image sensor aperture, or an exposure time of the second image, may be set based on the depth information. In some aspects, a focal distance of an imaging sensor such as imaging sensor 602 may be set based on the depth information. In some aspects, whether a flash is used when capturing the second image is also based on the depth information. For example, if the depth information indicates objects within the scene are within a particular distance range, the flash may be used. If objects in the scene are outside the particular distance range, the flash may not be used. In some aspects, a brightness or duration of the flash may also be based on the depth information. Additionally, in some aspects, block 740 may include post image capture processing operations that are also based on the depth information. For example, one or more of depth of field adjustment, z-buffering or z-culling, shadow mapping, or subsurface scattering, or white balance may be performed based on the depth map. In some aspects, the second image and the depth information may be utilized for three dimensional surface reconstruction. For example, an electronic representation of a three dimensional image may be created based on the second image and the depth information and/or the depth map. In some aspects, block 740 includes writing the second image to an output device. For example, the second image may be written to the storage 612 in some aspects. In some other aspects, the second image may be written to a network. In some aspects, one or more of the functions discussed above with respect to block 740 may be performed by instructions included in the image capture module 614e, which configure the processor 606 to perform one or more of the recited functions.

Figure 8:
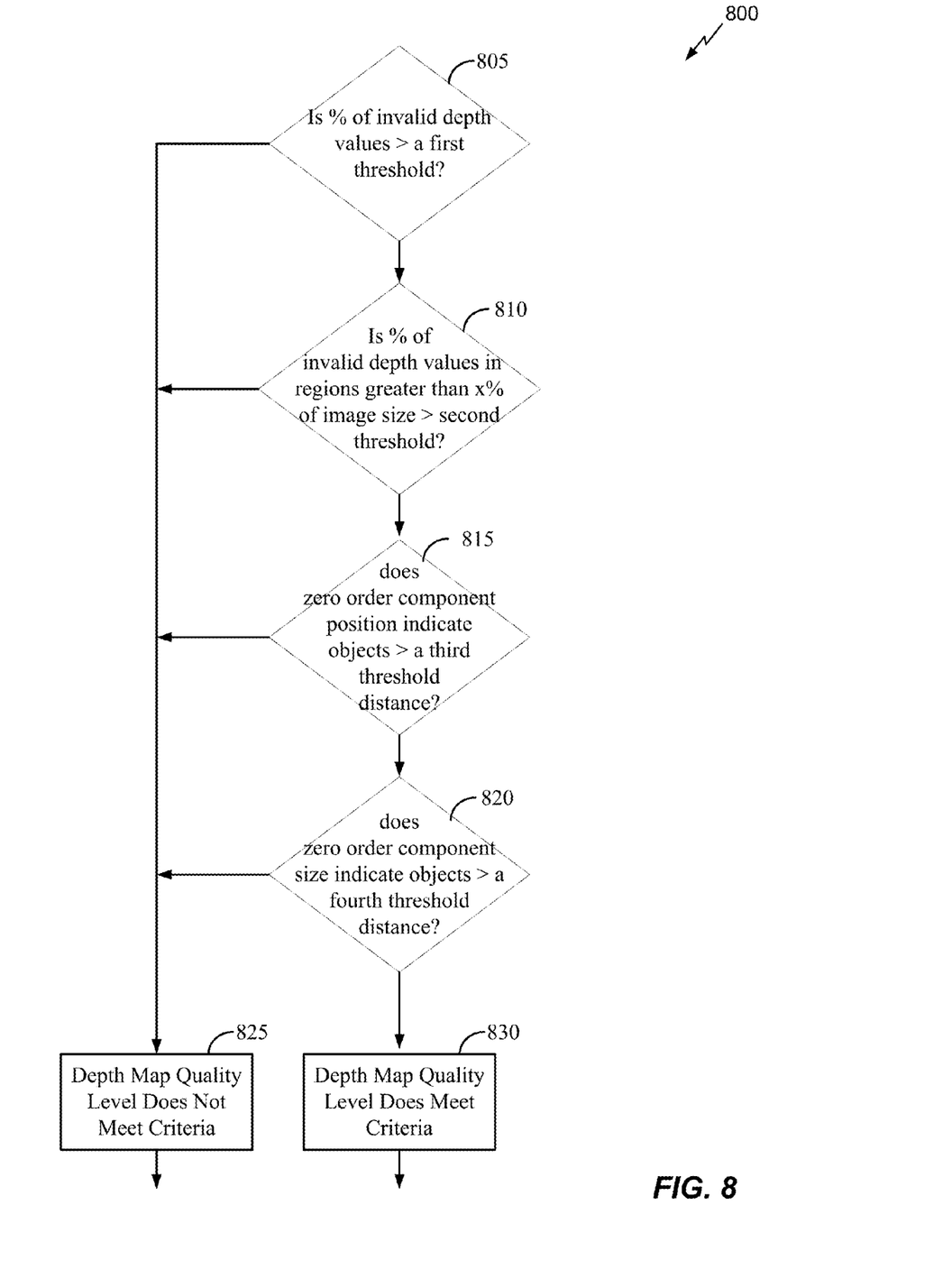
FIG. 8 is a flowchart of one exemplary method of determining a quality level of a depth map for an image.

FIG. 8 is a flowchart of one exemplary method of determining a quality level of a depth map for an image. In some aspects, the process 800 described below with respect to FIG. 8 may implement at least portions of blocks 720 and 725 of FIG. 7. While FIG. 8 shows decision blocks 805, 810, 815, and 820, in various aspects, one or more of these decision blocks may be omitted. In some aspects, process 8000 may be performed by instructions in the depth map quality module 614c configuring the processor 606 to perform one or more of the functions described below with respect to FIG. 8.

Decision block 805 determines whether a percentage of invalid depth values in the depth map is above a first threshold. If the percentage (or absolute number of depth values in some aspects) is above the first threshold, process 800 moves to block 825, which determines that the depth map quality level does not meet a criteria. The criteria may be equivalent to the criteria referenced in block 725 of FIG. 7. If the percentage (or absolute number of depth values) is below (or equal to in some aspects) the first threshold, process 800 moves to block 810.

Block 810 may first determine one or more regions of a depth map that include contiguous invalid depth values greater than a region size threshold. In some aspects, the region size threshold may be represented as a percentage of an image size. Block 810 may then count the number of depth values within the identified regions. Block 810 may then determine whether this count is greater than a second threshold. Thus, block 810 prefers depth maps having a particular number of invalid depth values to have those depth values more evenly distributed within the image, as opposed to depth maps with the same number of invalid depth values, but having those depth values clustered together in one or more regions. In some aspects, depth maps with more distributed invalid values may still support adequate downstream image processing (such as setting of image capture parameters or post-capture processing) as opposed to depth maps containing large regions of invalid depth values.

If the count is greater than the threshold, process 800 moves to block 825, which operates as described above. Alternatively, process 800 continues to block 815.

Block 815 determines a position of the zero order component in the image captured in block 710 of FIG. 7. If this position indicates depth values greater than a third threshold distance, process 800 moves to block 825, which again operates as described above. In other words, if the zero order component indicates that the scene depth is beyond the effective range of the structured light pattern used to generate the depth map, it is highly likely the depth map is invalid, and process 800 operates as such. Otherwise, process 800 moves to block 820.

Block 820 determines a size of the zero order component in the image captured in block 710 of FIG. 7. For example, as discussed above, a second calibration table may be maintained by one or more of the disclosed embodiments that provides a mapping between a size of a zero order component within a captured image and a previously observed depth of objects in a scene when that zero order component size was experienced. Thus, block 820 may derive an indication of object depth based on the size of the zero order component in the image of block 710 of FIG. 7. For example, larger zero order components may indicate objects in the scene are closer to an imaging device, while smaller zero order components may indicate objects in the scene are further away from the imaging device. If the size of the zero order component indicates a distance beyond a fourth threshold distance, process 800 moves to block 825, which operates as described above. Otherwise, process 800 moves to block 830, which determines that the depth map meets a criteria. Thus, in some aspects, if process 800 reaches block 830, then process 700 moves from block 725 to block 730.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of depth sensing, comprising:
   illuminating a scene, the illumination including a structured light pattern component, and a zero order component;
   capturing an image of the illuminated scene;
   generating a depth map for the scene based on the structured light pattern in the image;
   determining a quality level of the depth map;
   in response to the quality level of the depth map meeting a first criteria:
      determining depth information based on a position of the zero order component in the image, and
      generating a second image based on the depth information.

2. The method of claim 1, further comprising generating a second image based on the depth map in response to the quality level of the depth map meeting a second criteria.

3. The method claim 1, further comprising writing the second image to an output device.

4. The method of claim 1, wherein determining depth information based on the zero order component position comprises
   comparing the determined zero order position to predetermined positions corresponding to predetermined depths; and
   determining the depth information based on the comparison.

5. The method of claim 4, further comprising interpolating between two predetermined positions based on the position of the zero order component in the image;
   and determining the depth information based on the interpolation.

6. The method of claim 1, wherein determining the quality of the depth map comprises determining a percentage of invalid depth values in the depth map, wherein the quality of the depth map is based, at least in part, on the percentage of invalid depth values.

7. The method of claim 6, wherein determining the quality of the depth map comprises determining a size of a region of invalid depth values in the depth map, wherein the quality of the depth map is based, at least in part, on the size.

8. An apparatus for depth sensing, comprising:
an image sensor;
a light emitter; and
an electronic hardware processor, configured to:
illuminate a scene using the light emitter, the illumination including a structured light pattern component, and a zero order component,
capture an image of the illuminated scene with the image sensor,
generating a depth map for the scene based on the structure light pattern in the image,
determining a quality level of the depth map, and
in response to the quality level of the depth map meeting a first criteria
determine depth information based on a position of the zero order component in the image, and
generate a second image based on the depth information.

9. The apparatus of claim 8, wherein the electronic hardware processor is further configured to generate a second image based on the depth map in response to the quality level of the depth map meeting a second criteria.

10. The apparatus claim 8, wherein the electronic hardware processor is further configured to write the second image to an output device.

11. The apparatus of claim 8, wherein determining depth information based on the zero order component position comprises
comparing the determined zero order position to predetermined positions corresponding to predetermined depths; and
determining the depth information based on the comparison.

12. The apparatus of claim 11, wherein the electronic hardware processor is further configured to interpolate between two predetermined positions based on the position of the zero order component in the image; and determine the depth information based on the interpolation.

13. The apparatus of claim 8, wherein the electronic hardware processor is further configured to determine the quality of the depth map by determining a percentage of invalid depth values in the depth map, wherein the quality of the depth map is based, at least in part, on the percentage of invalid depth values.

14. The apparatus of claim 13, wherein the electronic hardware processor is further configured to determine the quality of the depth map by determining a size of a region of invalid depth values in the depth map, wherein the quality of the depth map is based, at least in part, on the size.

15. A computer readable storage medium comprising instructions that when executed cause an electronic hardware processor to perform a method of depth sensing, the method comprising:
illuminating a scene, the illumination including a structured light pattern component, and a zero order component;
capturing an image of the illuminated scene;
generating a depth map for the scene based on the structure light pattern in the image;
determining a quality level of the depth map;
in response to the quality level of the depth map meeting a first criteria:
determining depth information based on a position of the zero order component in the image, and
generating a second image based on the depth information.

16. The computer readable storage medium of claim 15, further comprising generating a second image based on the depth map in response to the quality level of the depth map meeting a second criteria.

17. The computer readable storage medium claim 15, the method further comprising writing the second image to an output device.

18. The computer readable storage medium of claim 15, wherein determining depth information based on the zero order component position comprises
comparing the determined zero order position to predetermined positions corresponding to predetermined depths; and
determining the depth information based on the comparison.

19. The computer readable storage medium of claim 18, the method further comprising interpolating between two predetermined positions based on the position of the zero order component in the image; and determining the depth information based on the interpolation.

20. The computer readable storage medium of claim 15, wherein determining the quality of the depth map comprises determining a percentage of invalid depth values in the depth map, wherein the quality of the depth map is based, at least in part, on the percentage of invalid depth values.

* * * * *